United States Patent Office 3,484,441
Patented Dec. 16, 1969

3,484,441
DIHYDROXYARYLBENZOQUINOXALINE DYESTUFFS
Hans Altermatt, Reinach, Basel-Land, Switzerland, assignor to Ciba Limited, Basel, Switzerland, a Swiss company
No Drawing. Filed May 17, 1967, Ser. No. 639,027
Claims priority, application Switzerland, June 7, 1966, 8,199/66
Int. Cl. C09b 17/04; C08k 1/74
U.S. Cl. 260—250                             3 Claims

ABSTRACT OF THE DISCLOSURE

The present invention concerns new yellow azine dyestuffs which are obtained by condensation of a di-(ortho-hydroxyaryl)-α,β-diketone with an ortho-diamino-naphthalene. The new dyestuffs are of high temperature resistance and especially valuable for the melt-colouration of spinning compositions, such as polyolefins, polyamides and polyesters.

---

The present invention is based on the observation that valuable, new azine dyestuffs of the formula

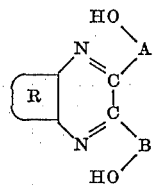

in which R represents a naphthalene residue and A and B represent aryl residues, especially benzene or naphthalene residues, in which the hydroxyl group in each case is in ortho-position to an azomethine group, may be obtained when (a) an ortho-diamino-naphthalene is condensed with a diketone of the formula

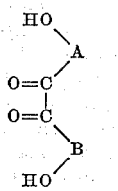

in which A and B represent aryl residues, especially benzene or naphthalene residues, in which in each case the hydroxyl group is in ortho-position to a keto group, or (b) a dihalogenated quinoxaline of the formula

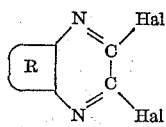

in which R has the meaning given above, is condensed with 2 mols of a hydroxyaryl compound or with 1 mol each of two different hydroxyaryl compounds in the presence of a Friedel-Crafts catalyst.

The starting material which can be used is, for example, 1,2-diaminonaphthalene or especially 2,3-diaminonaphthalene.

The residues A and B in the diketones to be used in accordance with the invention are preferably identical aryl residues, especially benzene or naphthalene residues. In addition to the hydroxyl groups, these residues may also contain other substituents, for example, halogen atoms or hydroxyl, alkoxy, phenoxy, alkyl, phenyl or phenalkyl groups. Compounds which are of special interest are those corresponding to the formula

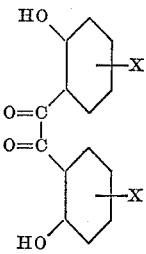

in which each X represents a hydrogen atom or one of the above-mentioned substituents.

Condensation is advantageously carried out in an organic solvent in the presence of an acidic condensing agent, preferably an aliphatic carboxylic acid, especially acetic acid, with the application of heat.

In process (b) of the invention, the starting material used is, for example, a 2,3-dichloroquinoxaline, preferably 2,3-dichlorobenzoquinoxaline. It is advantageously condensed with 2-hydroxynaphthalene or with a phenol of the formula

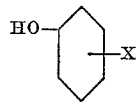

in which X has the meaning given above.

Examples are phenol, para-chlorophenol, meta-chlorophenol, ortho-, meta- or para-methylphenol, resorcinol, resorcinol-, monomethyl-, butyl- or octyl- ether or para-hydroxydiphenyl.

It is preferred to use aluminium chloride as the Friedel-Crafts catalyst, advantageously 1 mol to 1 mol of the hydroxybenzene or hydroxynaphthalene.

The reaction is preferably carried out in the presence of an inert organic solvent, for example, carbon disulphide, benzene halogenated benzenes, for example, chlorobenzene, ortho-dichlorobenzene or trichlorobenzene, or nitrobenzene or a halogenated alkane, especially tetrachloroethane, advantageously at a temperature between room temperature and 150° C. while stirring.

Working up is effected advantageously by discharging the reaction mixture into dilute hydrochloric acid. The solvent is advantageously removed by extraction or steam distillation. Since the products are obtained in an excellent state of purity, further purification, for example, by recrystallization, is generally unnecessary.

The di - (hydroxyphenyl)- or di - (hydroxynaphthyl)-quinoxalines obtained are valuable greenish yellow dyestuffs which can be used for dyeing a very wide variety of materials. By virtue of their high thermal stability they are specially suitable for use in the melt-colouration of spinning compositions, for example, polyvinyl chloride, polyolefins, for example, polyethylene and polypropylene, polyesters, for example, polyethylene terephthalate, and polyamides, for example, those derived from ε-caprolactam, hexamethylenediamine and adipic acid, or ω-aminoundecanoic acid.

The polymers to be coloured are advantageously in the form of powders, grains or chips. They are coated with the dry dyestuff power; for example, they are mechanically mixed therewith in a manner such that the surface of the particles is coated with dyestuff. The dyestuff is advantageously in a state of fine division. Specially good results are obtained by the use of dyestuff preparations consisting of a fine powder of the material to be coloured containing the dyestuff in a uniform state of dispersion. Preparations of this kind are obtainable, for example, by the process described in Belgian patent specification No. 567,953, wherein a pigment is dispersed in a solution of a polyamide in formic acid and the pigmented polyamide is precipitated by the addition of water.

The coated particles of synthetic material so obtained are then melted and spun or shaped in some other way, for example, made into films, by known methods. The synthetic materials may also be coloured by adding the dyestuff either prior to, during, or immediately after the polycondensation of the monomers. The coloured material so obtained is then further shaped alone like uncoloured material or together with material of another colour or with uncoloured material.

The coloured melts obtained by the process of the invention can be processed into shaped structure; in particular, they can be spun into fibres. The coloured fibres so obtained have a highly valued, greenish yellow tint of good brilliance and possessing an excellent fastness to light and to wet treatments.

The following examples illustrate the invention. Unless otherwise stated, the parts and percentages are by weight.

EXAMPLE 1

12.1 parts of salicil are stirred with 8 parts of 2,3-diaminonaphthalene in 150 parts by volume of glacial acetic acid for 1½ hours under reflux. 150 parts of water are added, the batch is allowed to cool, the precipitate is isolated by filtration, washed with water until the washings run neutral and then dried. The dyestuff of the formula

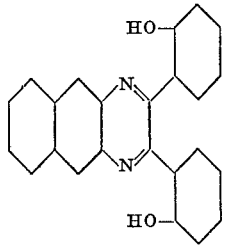

crystallizes from xylene in the form of yellow needles.

EXAMPLE 2

An orange-yellow dyestuff is obtained when the 8 parts of 2,3-diaminonaphthalene used according to Example 1 are replaced by 8 parts of 1,2-diaminonaphthalene.

EXAMPLE 3

12 parts of 2,2'-dihydroxy-4,4'-dibromobenzil are stirred with 4.8 parts of 2,3-diaminonaphthalene in 100 parts by volume of glacial acetic acid for 1 hour under reflux. When the batch is cool, the yellow dyestuff of the formula

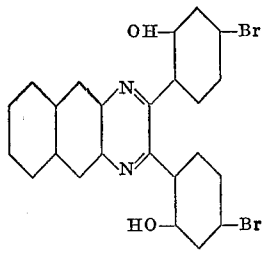

is separated, washed with water and dried.

EXAMPLE 4

135 parts of aluminium chloride are added, while stirring, to a suspension of 150 parts of 2,3-dichlorobenzoquinoxaline and 112 parts of resorcinol in 300 parts by volume of nitrobenzene in a manner such that the temperature does not exceed 80° C. When the addition has been made, the batch is stirred for 3 hours at 50° C., discharged into dilute hydrochloric acid, and the nitrobenzene is removed with steam. The residue is recrystallized from dimethyl formamide. The yellow dyestuff corresponds to the formula

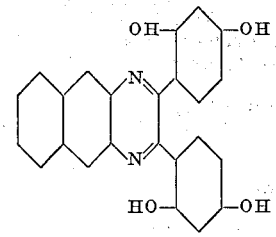

EXAMPLE 5

20 grams of the dyestuff obtained in the manner described in Example 4 are etherified with 19.3 parts of octylbromide in the presence of 5.6 parts of potassium hydroxide for 24 hours at 120° C. in 150 parts by volume of methylcellosolve. The solution is filtered until clear and then concentrated until crystallization commences. The yellow dyestuff so obtained corresponds to the formula

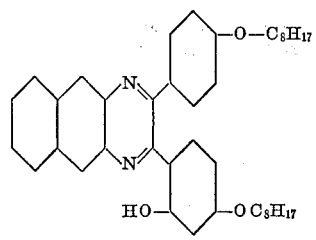

If instead of octylbromide ethylbromide, isobutylbromide or methyliodide is used as alkylating agent a yellow dyestuff of similar properties is obtained.

EXAMPLE 6

The yellow dyestuff of the formula

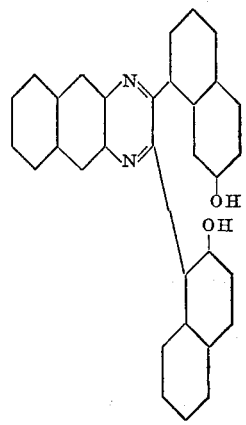

may be obtained by replacing the 112 parts of resorcinol in Example 4 by 144 parts of β-naphthol.

EXAMPLE 7

100 parts of a polyamide of the "Perlon" type in the form of chips, which has been produced in known manner from caprolactam, are admixed with 1 part of any one of the dyestuffs of Examples 1 to 5 in a mixing drum. The chips so prepared are spun into filaments by the melt-spinning process customarily adopted for polyamide-6. The yellow polyamide filaments so obtained display a very good fastness to light.

EXAMPLE 8

100 parts of polyethylene terephthalate chips of the "Terylene" type produced in known manner from terephthalic acid and glycol are coated with 1 part of the dyestuff (in powder form) of Example 2. The chips so prepared are spun into filaments in the usual manner at about 270° C. The yellow polyester fibres so obtained display good properties of fastness.

EXAMPLE 9

100 parts of polypropylene chips ("Moplen") are admixed with 1 part of the dyestuff of Example 3. The powdered chips are spun into filaments under the usual conditions by the melt-spinning process. The yellow filaments so obtained display very good properties of fastness.

EXAMPLE 10

A paste prepared from 100 parts of polyvinyl chloride, 50 parts by volume of dioctyl phthalate and 0.3 part of the dyestuff obtained in the manner described in Example 1 is rolled into a film on a roller mill at a temperature of 150 to 155° C. The yellow polyvinyl chloride film so obtained displays a good fastness to light.

I claim:
1. An azine dyestuff of the formula

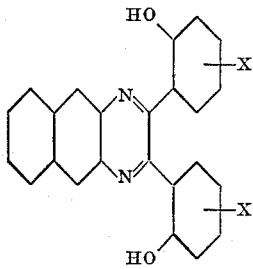

in which X is hydrogen, halogen, hydroxy or alkoxy.

2. The compound of the formula

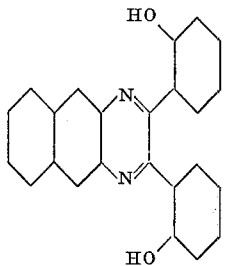

3. An azine dyestuff of the formula

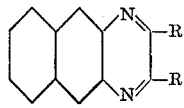

wherein R is selected from the group consisting of 2-hydroxynaphthalenyl and 2-hydroxyphenyl, each of said R containing the same group at any one time and wherein said 2-hydroxyphenyl may be substituted with a substituent selected from the group consisting of halogen, hydroxy and alkoxy.

References Cited

Chemical Abstracts, vol. 65, p. 8910 (1966).
Chemical Abstracts, vol. 62, p. 1181(d) 1965.
Chemical Abstracts, vol. 57, p. 16635(a) 1962.
Chemical Abstracts, vol. 31, p. 6224[8] (1937).

NICHOLAS S. RIZZO, Primary Examiner

U.S. Cl. X.R.

8—55; 260—37, 39, 40, 41